United States Patent
Lin

(10) Patent No.: US 11,385,493 B1
(45) Date of Patent: Jul. 12, 2022

(54) TOUCH DISPLAY PANEL

(71) Applicant: AU Optronics Corporation, Hsin-Chu (TW)

(72) Inventor: Wei-Lin Lin, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 17/325,248

(22) Filed: May 20, 2021

(30) Foreign Application Priority Data

Dec. 25, 2020 (TW) .................................. 109146273

(51) Int. Cl.
*G02F 1/1335* (2006.01)
*G02F 1/1333* (2006.01)
*G06F 3/041* (2006.01)

(52) U.S. Cl.
CPC .... *G02F 1/133514* (2013.01); *G02F 1/13338* (2013.01); *G06F 3/0412* (2013.01); *G02F 2203/30* (2013.01)

(58) Field of Classification Search
CPC ........... G02F 1/133514; G02F 1/13338; G02F 2203/30; G06F 3/0412
USPC ......................................................... 349/12
See application file for complete search history.

(56) References Cited

U.S. PATENT DOCUMENTS

| 8,493,347 B2 | 7/2013 | Chen et al. | |
| 2012/0268418 A1* | 10/2012 | Ishizaki | G06F 3/041 345/174 |
| 2018/0300009 A1 | 10/2018 | Kurasawa et al. | |
| 2021/0191552 A1* | 6/2021 | Bok | G06F 1/1681 |

FOREIGN PATENT DOCUMENTS

| CN | 108733256 A | 11/2018 |
| TW | I622913 B | 5/2018 |
| TW | 201905655 A | 2/2019 |

* cited by examiner

*Primary Examiner* — Charles S Chang
(74) *Attorney, Agent, or Firm* — WPAT, PC

(57) ABSTRACT

A touch display panel includes an array substrate, a display medium layer, a filter substrate and a touch electrode layer. The array substrate includes a substrate and sub-pixel units. The filter substrate includes a filter layer. The filter layer includes color resists. Each of the color resists corresponds to each of the sub-pixels one by one and includes a first region, a second region and a third region. The touch electrode layer has a plurality of slits. The slits have normal projection areas A1, A2 and A3 over the first region, the second region and the third region. The first region, the second region and the third region have areas F1, F2, F3, respectively, and satisfy one of the relations of $|(A1/F1)-[(A2+A3)/(F2+F3)]|<10\%$, $|(A2/F2)-[(A1+A3)/(F1+F3)]|<10\%$ or $|(A3/F3)-[(A1+A2)/(F1+F2)]|<10\%$.

11 Claims, 7 Drawing Sheets

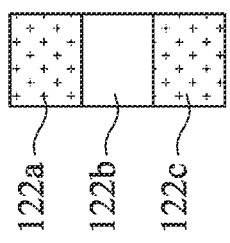
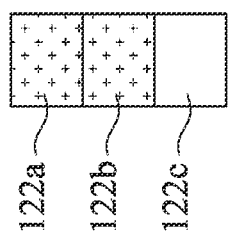
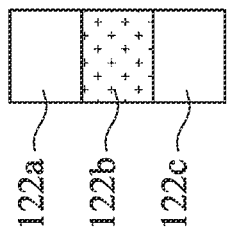
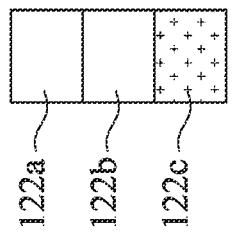

TOUCH DISPLAY PANEL

CROSS-REFERENCE TO RELATED APPLICATION

This application claims priority to Taiwan Application Serial Number 109146273, filed Dec. 25, 2020, which are herein incorporated by reference in its entirety.

BACKGROUND

Field of Invention

The present disclosure relates to a touch display panel.

Description of Related Art

Among the memory in pixel (MIP) display at present, the common types thereof include reflective displays. The MIP display cannot display gray scale. The MIP display is similar to a normal display and can go with an on-cell touch panel (oTP). To reduce a mura issue, the on-cell touch display has slits cut therein. The design of slits is related to the pixels.

To increase the gray scale display of the MIP display, the gray scale can be controlled through the light-transmitting regions. Because the light-transmitting regions has a smallest unit different from a smallest unit of the normal display. When it goes with the past on-cell touch panel with the slit design rule, it is prone to the mura issue.

SUMMARY

Some embodiments of the present disclosure provide a touch display panel with reduced visibility of touch electrode layer and decreased mura issue.

Some embodiments of the present disclosure provide a touch display panel including an array substrate, a display medium layer, a color filter substrate and a color filter substrate. The array substrate includes a substrate and a plurality of sub-pixel units on the substrate. The display medium layer is on the array substrate. The color filter substrate includes a color filter layer and an opposite substrate. The color filter layer is between the display medium layer and the opposite substrate. The color filter layer comprises a plurality of color resists arranged in an array along a first direction and a second direction. The first direction crosses the second direction. Each of the color resists corresponds to each of the sub-pixel units one by one and comprises a first region, a second region and a third region arranged along the first direction and overlapping the same sub-pixel unit. The color filter substrate is on the color filter substrate. The touch electrode layer has a plurality of slits. The slits have normal projection areas A1, A2 and A3 over the first region, the second region and the third region, respectively. The first region, the second region and the third region have areas F1, F2 and F3, respectively, and satisfy one of the following relations: $|(A1/F1)-[(A2+A3)/(F2+F3)]|<10\%$, $|(A2/F2)-[(A1+A3)/(F1+F3)]|<10\%$ or $|(A3/F3)-[(A1+A2)/(F1+F2)]|<10\%$.

Based on above, in the touch display panel in accordance with one embodiment of the present disclosure, by the slits having normal projection areas A1, A2 and A3 over the first region, the second region and the third region, respectively, the first region, the second region and the third region have areas F1, F2 and F3, respectively, and satisfy one of the following relations: $|(A1/F1)-[(A2+A3)/(F2+F3)]|<10\%$, $|(A2/F2)-[(A1+A3)/(F1+F3)]|<10\%$ or $|(A3/F3)-[(A1+A2)/(F1+F2)]|<10\%$, thereby reducing a visibility of the touch electrode layer and reducing the mura issue.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIGS. 4-9 are schematic diagrams of illuminating states of a first reflective piece, a second reflective piece and a third reflective piece of the sub-pixel unit of the touch display panel in accordance with one embodiment of the present disclosure.

DETAILED DESCRIPTION

Figure 1A:
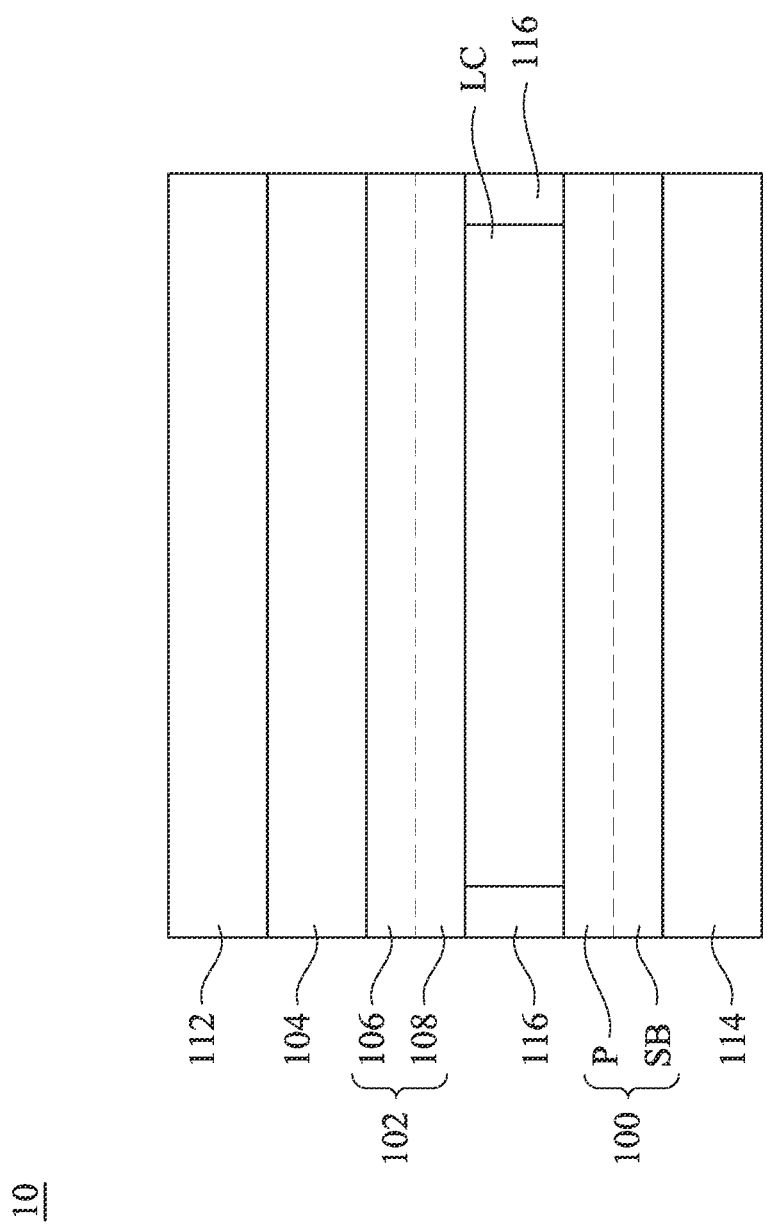
FIG. 1A is a cross-sectional view of a touch display panel according to one embodiment of the present disclosure.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "underlying," "below," "lower," "overlying," "upper" and the like, may be used herein for ease of description to describe one element or feature's relationship to another element(s) or feature(s) as illustrated in the figs. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
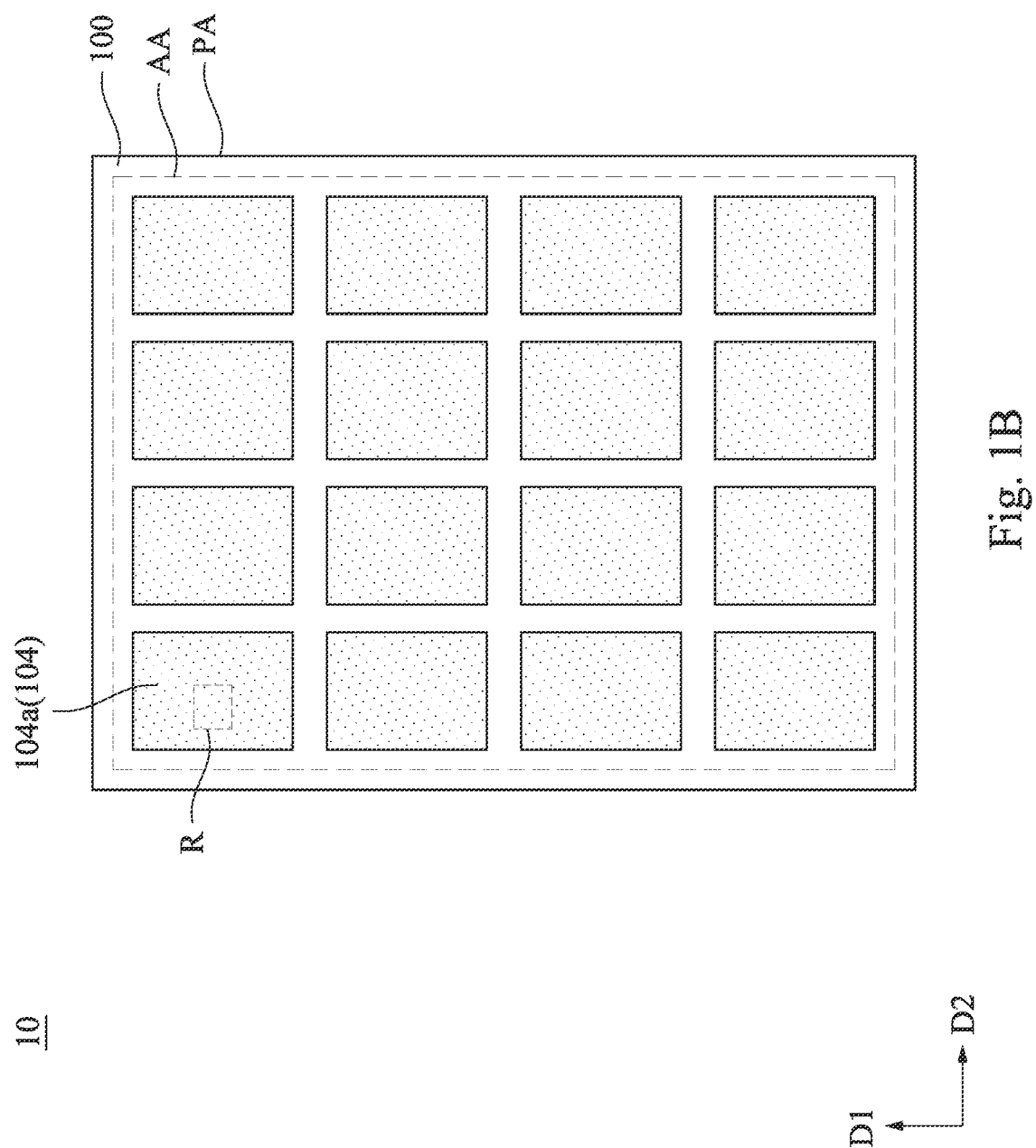
FIG. 1B is a top view of the touch display panel of FIG. 1A.
Figure 2:
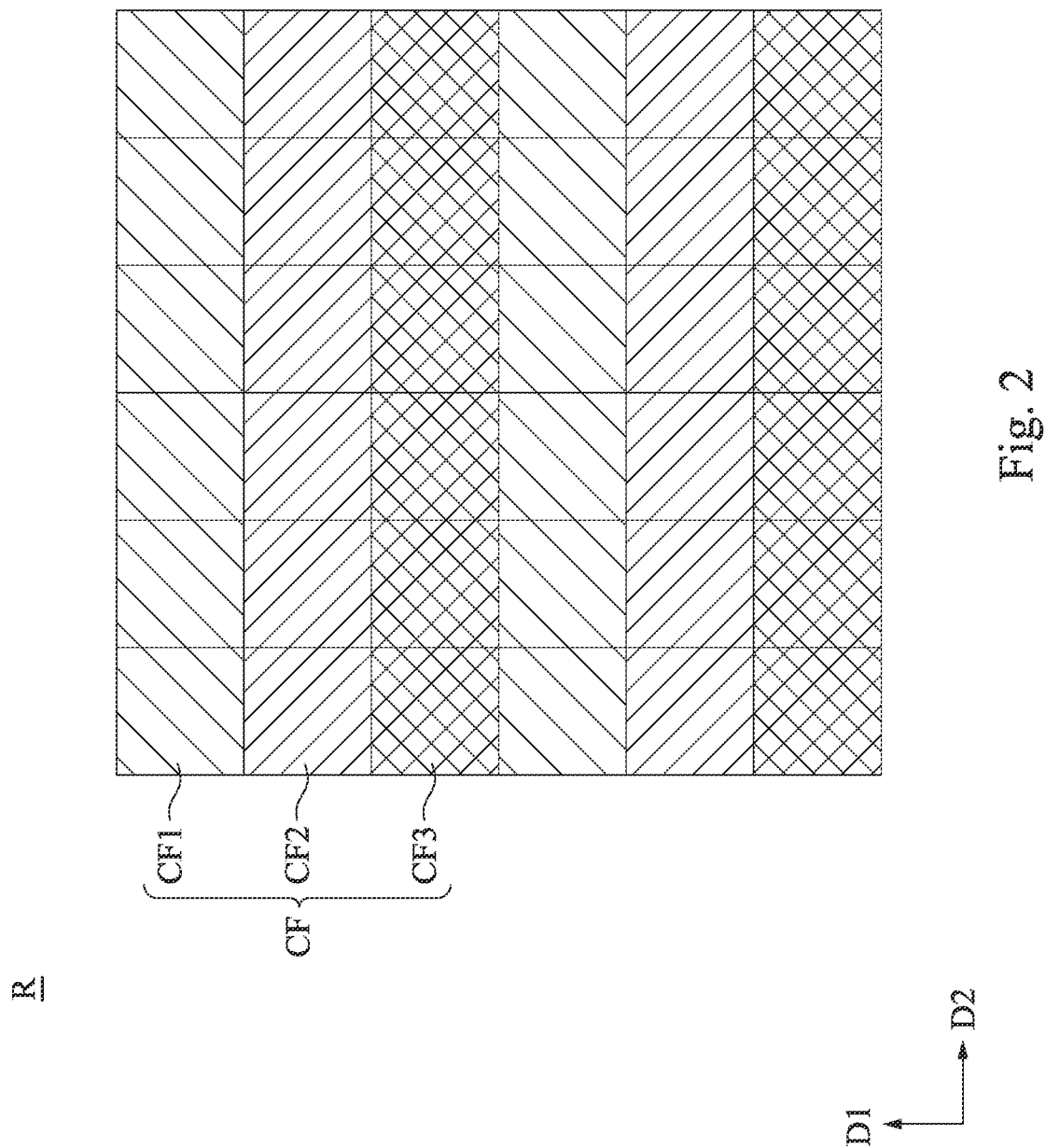
FIG. 2 is a top view of a region R of FIG. 1B.
Figure 3:
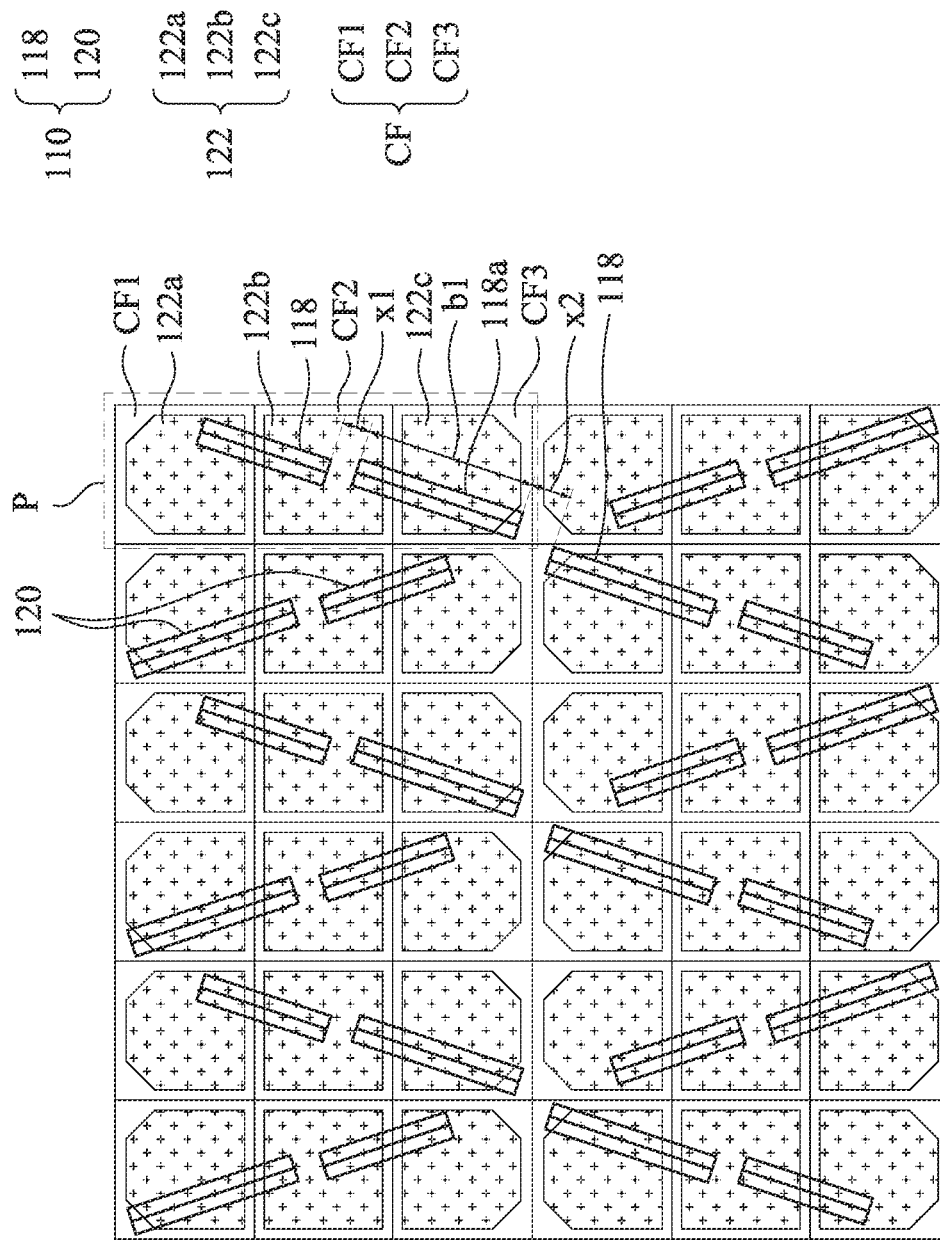
FIG. 3 is a top view of color resists of a color filter layer on the region R of FIG. 1B.

FIG. 1A is a cross-sectional view of a touch display panel 10 according to one embodiment of the present disclosure. FIG. 1B is a top view of the touch display panel 10 of FIG. 1A. FIG. 2 is a top view of a region R of FIG. 1B. FIG. 3 is a top view of color resists CF of a color filter layer 108 of the region R of FIG. 1B. Reference is made to FIGS. 1A-3.

The touch display panel 10 includes an array substrate 100, a display medium layer LC, a color filter substrate 102 and a touch electrode layer 104. The array substrate 100 includes a substrate SB and a plurality of sub-pixel units P on the substrate SB. The touch electrode layer 104 is on the color filter substrate 102. The display medium layer LC is on the array substrate 100. In the present embodiment, the display medium layer LC is, for example, a liquid crystal layer.

The color filter substrate 102 includes an opposite substrate 106 and a color filter layer 108 on the opposite substrate 106. The color filter layer 108 is between the display medium layer LC and the opposite substrate 106. That is, the color filter layer 108 is on one side of the opposite substrate 106 which faces the display medium layer LC. That is, the color filter layer 108 and the touch electrode layer 104 are on opposite sides of the opposite substrate 106. The substrate SB and the opposite substrate 106 may include glass, quartz, organic polymers or other suitable materials.

The color filter layer 108 is on the display medium layer LC. The color filter layer CF includes a plurality of color resists CF. The color resists CF are arranged in an array along a first direction D1 and a second direction D2. The first direction D1 crosses the second direction D2. For example, the first direction D1 is a longitudinal direction in FIGS. 2 and 3. The second direction D2 is a horizontal direction in FIGS. 2 and 3. The first direction D1 is perpendicular to the second direction D2. For example, the color resists CF may be red color resists, green color resists or blue color resists.

The touch display panel 10 includes a display region AA and a periphery region PA. The periphery region PA surrounds the display region AA. The touch electrode layer 104 has touch electrode pieces 104a arranged in an array. For example, the touch electrode pieces 104a are arranged along the first direction D1 and the second direction D2.

Each of the color resists CF corresponds to each of the sub-pixel units P one by one and includes a first region CF1, a second region CF2 and a third region CF3 which overlap the same sub-pixel region P and are arranged along the first direction D1. That is, the first region CF1, the second region CF2 and the third region CF3 of the same color resist CF are color resists of the same color. By controlling the sub-pixel unit P corresponding to the first region CF1, the second region CF2 and the third region CF3 to be bright on dark, a gray scale of the light can be controlled. In the present embodiment, the sub-pixel unit P has a size different from sizes of the first region CF1, the second region CF2 and the third region CF3. For example, the size of the sub-pixel unit P is greater than the sizes of the first region CF1, the second region CF2 and the third region CF3, respectively.

The touch electrode layer 104 is on the color filter layer 108. The touch electrode layer 104 has a plurality of slits 110. The slits 110 have normal projection areas A1, A2 and A3 over the first region CF1, the second region CF2 and the third region CF3 respectively. The first region CF1, the second region CF2 and the third region CF3 have areas F1, F2 and F3, respectively, and satisfy one of the following relations: $|(A1/F1)-[(A2+A3)/(F2+F3)]|<10\%$, $|(A2/F2)-[(A1+A3)/(F1+F3)]|<10\%$ or $(A3/F3)-[(A1+A2)/(F1+F2)]|<10\%$. That is, in the same sub-pixel unit P, a difference between an area ratio of the slits 110 of those in the first region CF1, the second region CF2 and the third region CF3 that must emit light at the same time and an area ratio of the slits 110 of remaining ones is less than 10%. In the present embodiment, the second region CF2 is between the first region CF1 and the third region CF3.

For example, FIGS. 4-9 are schematic diagrams of a first reflective piece 122a, a second reflective piece 122b and a third reflective piece 122c of the sub-pixel unit P of the touch display panel 10 (see FIG. 3) according to one embodiment of the present disclosure. Reference is made to FIG. 3, FIG. 4 and FIG. 5. For example, the normal projection areas A1, A2 and A3 and the areas F1, F2 and F3 satisfy the following relations: $|(A1/F1)-[(A2+A3)/(F2+F3)]|<10\%$. That is, the second region CF2 and the third region CF3 must emit light at the same time (see FIG. 4) or not emit light at the same time (see FIG. 5), thereby decreasing a visibility of the touch electrode layer 104 and reducing the mura issue. For example, in condition that each of the color resists CF corresponds to each of the sub-pixel units P one by one and includes a first region CF1, a second region CF2 and a third region CF3 arranged along the first direction D1 and overlapping the same sub-pixel unit P, the mura issue caused by all of the sizes of the first region CF1, the second region CF2 and the third region CF3 being different from the size of the sub-pixel unit P can be solved.

Reference is made to FIG. 3, FIG. 6 and FIG. 7. In some other embodiments, the normal projections A1, A2 and A3 and the areas F1, F2 and F3 satisfy the following relations: $|(A2/F2)-[(A1+A3)/(F1+F3)]|<10\%$. That is, the first region CF1 and the third region CF3 must emit light at the same time (see FIG. 6) or not emit light at the same time (see FIG. 7), thereby decreasing the visibility of the touch electrode layer 104 and reducing the mura issue. For example, in condition that each of the color resists CF corresponds to each of the sub-pixel units P one by one and includes a first region CF1, a second region CF2 and a third region CF3 arranged along the first direction D1 and overlapping the same sub-pixel unit P, the mura issue caused by all of the sizes of the first region CF1, the second region CF2 and the third region CF3 being different from the size of the sub-pixel unit P can be solved.

Reference is made to FIG. 3, FIG. 8 and FIG. 9. In some other embodiments, the normal projections A1, A2 and A3 and the areas F1, F2 and F3 satisfy the following relations: $|(A3/F3)-[(A1+A2)/(F1+F2)]|<10\%$. That is, the first region CF1 and the second region CF2 must emit light at the same time (see FIG. 8) or not emit light at the same time (see FIG. 9), thereby decreasing the visibility of the touch electrode layer 104 and reducing the mura issue. For example, in condition that each of the color resists CF corresponds to each of the sub-pixel units P one by one and includes a first region CF1, a second region CF2 and a third region CF3 arranged along the first direction D1 and overlapping the same sub-pixel unit P, the mura issue caused by all of the sizes of the first region CF1, the second region CF2 and the third region CF3 being different from the size of the sub-pixel unit P can be solved.

The slits 110 further include a second group of slit 120. The second group of slit 120 extends along a fourth direction D4. The fourth direction D4 crosses the first direction D1, the second direction D2 and the third direction D3. The fourth direction D4 is not perpendicular to the first direction D1, the second direction D2 and the third direction D3.

In the present embodiment, each of the color resists CF overlaps at least one of the slits 110, thereby decreasing the visibility of the touch electrode layer 104.

Referring back to FIG. 1A, in the present embodiment, the touch display panel 10 further includes an upper polarizer 112 and a lower polarizer 114. The upper polarizer 112 is disposed on an outer surface of the touch electrode layer 104. The lower polarizer 114 is disposed on an outer surface of the array substrate 100. However, the present disclosure is not limited thereto. In the present embodiment, the touch display panel 10 further includes a sealant 116. The sealant 116 is, for example, an optical adhesive. The sealant 116 surrounds the display medium layer LC and is between the array substrate 100 and the color filter substrate 102.

Thereafter, referring back to FIG. 3, the slits 110 include a first group of slits 118. The first group of slits 118 extends along the third direction D3. The third direction D3 crosses the first direction D1 and the second direction D2. The third direction D3 is not perpendicular to the first direction D1 and the second direction D2.

Figure 10:
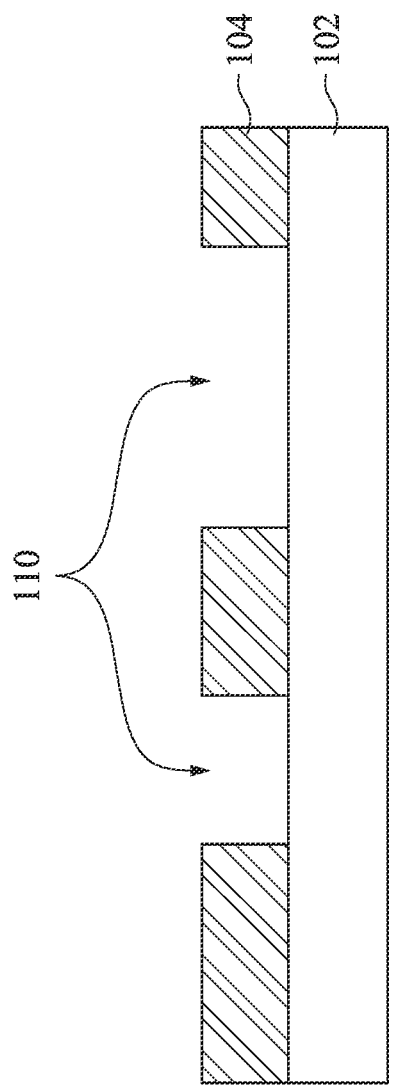
FIG. 10 is a partial cross-sectional view of the color filter substrate and the touch electrode layer of the touch display panel according to one embodiment of the present disclosure.

FIG. 10 is a partial cross-sectional view of the color filter substrate 102 and the touch electrode layer 104 of the touch display panel 10 according to one embodiment of the present disclosure. Referring to FIG. 3 and FIG. 10, the slits 110 expose a part of the area of the color filter substrate 102. In the present embodiment, the linear density of the slits 110 of the touch electrode layer 104 is greater than 65%. Reference is made to FIG. 3. For example, the first group of slits 118 includes a first slit 118a. The first slit 118a has a length equal to b1 along the third direction D3. Two of the first group of slits 118 closest to the first slit 118a have a first shortest distance equal to x1 and a second shortest distance equal to x2 respectively from the first slit 118a. A sum of the first shortest distance x1, the second shorted distance x2 and the length b1 along the third direction is a1 and satisfies the following relation: b1/a1>65%, thereby reducing a visibility of the touch electrode layer 104 and reducing the mura issue.

Referring back to FIG. 3, each of the sub-pixel units P of the array substrate 100 includes a plurality of reflective pieces 122. The reflective pieces 122 are disposed on the substrate SB and separated with each other. Each of the reflective pieces 122 corresponds to each of the first region CF1, the second region CF2 and the third region CF3 of each of the color resists CF one by one. The reflective pieces 122 include metal and reflect light to the display medium layer LC to allow the display region AA display an image. In the present embodiment, the touch display panel 10 is a reflective display panel.

Figure 11:
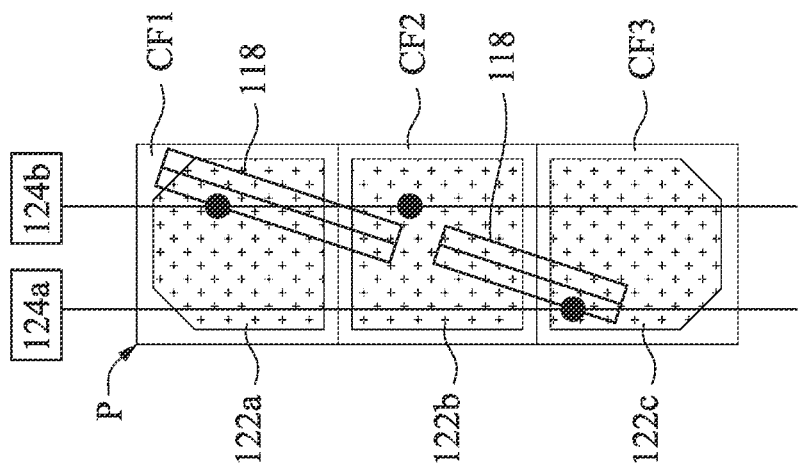
FIGS. 11-13 are top views of the sub-pixels according to one embodiment of the present disclosure.
Figure 12:
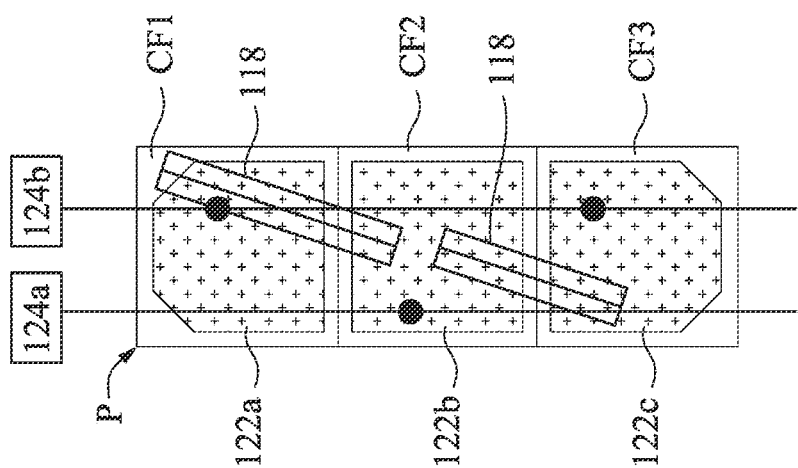
Figure 13:
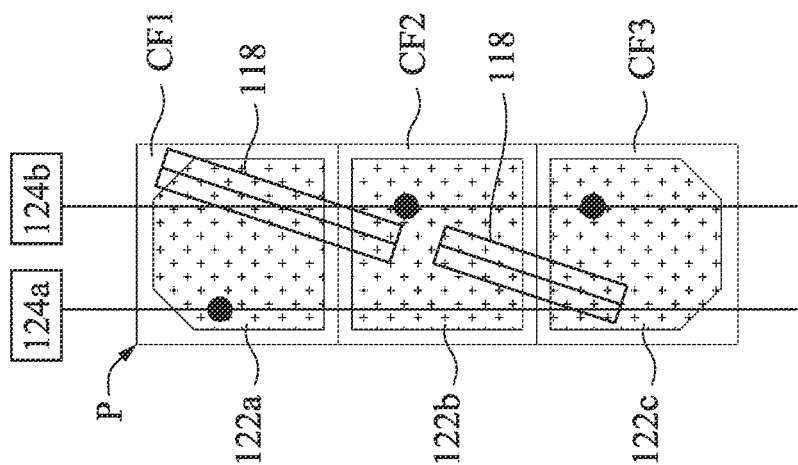

FIGS. 11-13 are top views of the sub-pixel units P according to one embodiment of the present disclosure. Referring to FIG. 11, each of the sub-pixel units P further includes a plurality of pixel memory circuits 124. The pixel memory circuits 124 are electrically connected to the reflective pieces 122. The reflective pieces 122 include a first reflective piece 122a, a second reflective piece 122b and a third reflective piece 122c. The first reflective piece 122a, the second reflective piece 122b and the third reflective piece 122c correspond to the first region CF1, the second region CF2 and the third region CF3 of each of the color resists CF. The pixel memory circuits 124 include a first circuit 124a. The first circuit 124a is electrically connected to one of the first reflective piece 122a, the second reflective piece 122b and the third reflective piece 122c and not electrically connected to another one thereof. For example, referring to FIG. 11, FIG. 4 and FIG. 5, the first circuit 124a is electrically connected to the first reflective piece 122a, and the first circuit 124a is not electrically connected to the second reflective piece 122b and the third reflective piece 122c. That is, the first circuit 124a can control whether the first reflective piece 122a is dark (see FIG. 4) or bright (see FIG. 5) and cannot control whether the second reflective piece 122b and the third reflective piece 122c are bright or dark. The pixel memory circuit 124 further includes a second circuit 124b. The second circuit 124b is electrically connected to the second reflective piece 122b and the third reflective piece 122c. That is, the second circuit 124b can control whether the second reflective piece 122b and the third reflective piece 122c are dark (see FIG. 5) or bright (see FIG. 4). By the above-mentioned configuration, a desired gray scale can be shown. In some embodiments, the first circuit 124a and the second circuit 124b are located along an arrangement direction of the first region CF1, the second region CF2 and the third region CF3 (see FIGS. 11-13). However, the present disclosure is not limited thereto. In some other embodiments, the first circuit 124a and the second circuit 124b can be located on left and right sides of the first region CF1, the second region CF2 and the third region CF3.

Referring to FIG. 12, FIG. 6 and FIG. 7, in some other embodiments, the first circuit 124a is electrically connected to the second reflective piece 122b, and the first circuit 124a is not electrically connected to the first reflective piece 122a and the third reflective piece 122c. That is, the first circuit 124a can control whether the second reflective piece 122b is dark (see FIG. 6) or bright (see FIG. 7) and cannot control whether the first reflective piece 122a and the third reflective piece 122c are bright or dark. The second circuit 124b is electrically connected to the first reflective piece 122a and the third reflective piece 122c. That is, the second circuit 124b can control whether the first reflective piece 122a and the third reflective piece 122c are dark (see FIG. 7) or bright (see FIG. 6). By the above-mentioned configuration, a desired gray scale can be shown.

Referring to FIG. 13, FIG. 8 and FIG. 9, in some other embodiments, the first circuit 124a is electrically connected to the third reflective piece 122c, and the first circuit 124a is not electrically connected to the first reflective piece 122a and the second reflective piece 122b. That is, the first circuit 124a can control whether the third reflective piece 122c is dark (see FIG. 8) or bright (see FIG. 9) and cannot control whether the first reflective piece 122a and the second reflective piece 122b are bright or dark. The second circuit 124b is electrically connected to the first reflective piece 122a and the second reflective piece 122b. That is, the second circuit 124b can control whether the first reflective piece 122a and the second reflective piece 122b are dark (see FIG. 9) or bright (see FIG. 8). By the above-mentioned configuration, a desired gray scale can be shown.

Based on above, according to one embodiment of the present disclosure, each of the color resists corresponds to each of the sub-pixel units one by one and comprises a first region, a second region and a third region arranged along the first direction and overlapping the same sub-pixel unit. The touch electrode layer has a plurality of slits. The slits have normal projection areas A1, A2 and A3 over the first region, the second region and the third region, respectively. The first region, the second region and the third region have areas F1, F2 and F3, respectively, and satisfy one of the following relations: $|(A1/F1)-[(A2+A3)/(F2+F3)]|<10\%$, $|(A2/F2)-[(A1+A3)/(F1+F3)]|<10\%$ or $(A3/F3)-[(A1+A2)/(F1+F2)]|<10\%$, thereby reducing the visibility of the touch electrode layer and reducing the mura issue.

Based on above, in the display panel according to one embodiment of the present disclosure, the first connecting electrode encapsulates the light emitting layer such that the normal projection of the light emitting layer over the array substrate is within the normal projection of the first connecting electrode over the array substrate. Therefore, the first connecting electrode can shade the upper output light of the light emitting diode and reflect this upper output light, thereby increasing the brightness of the lower output light of the light emitting diode and allowing the light emitting diode provide uniform light field. Therefore, the display panel in accordance of one embodiment of the present disclosure has good lower output light efficiency. Based on a similar reason, the tiled display in accordance of one embodiment of the present disclosure has good lower output light efficiency.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch display panel, comprising:
an array substrate comprising a substrate and a plurality of sub-pixel units on the substrate;
a display medium layer on the array substrate;
a color filter substrate comprising a color filter layer and an opposite substrate, wherein the color filter layer is between the display medium layer and the opposite substrate, the color filter layer comprises a plurality of color resists arranged in an array along a first direction and a second direction, the first direction perpendicular to the second direction, wherein each of the color resists corresponds to a particular one of the sub-pixel units and comprises a first region, a second region and a third region arranged along the first direction and overlapping the particular one of the sub-pixel unit; and
a touch electrode layer on the color filter substrate, wherein the touch electrode layer has a plurality of slits, the slits have normal projection areas A1, A2 and A3 over the first region, the second region and the third region, respectively, the first region, the second region and the third region have areas F1, F2 and F3, respectively, and satisfy one of the following relations: $|(A1/F1)-[(A2+A3)/(F2+F3)]|<10\%$, $|(A2/F2)-[(A1+A3)/(F1+F3)]|<10\%$ or $|(A3/F3)-[(A1+A2)/(F1+F2)]|<10\%$;
wherein the normal projection areas A1, A2, and A3 are positioned inside the color resists without overlapping a boundary of the particular one of the sub-pixel units.

2. The touch display panel of claim 1, wherein each of the color resists overlaps at least one of the slits.

3. The touch display panel of claim 1, wherein the slits comprises:
a first group of slits extending along a third direction, wherein the third direction crosses the first direction and the second direction, the first group of slits comprises a first slit, two of the first group of slits closest to the first slit have a first shortest distance equal to x1 and a second shortest distance equal to x2 respectively from the first slit, the first slit has a length equal to b1 along the third direction, a sum of x1, x2 and b1 is a1 and satisfies the following relation: $b1/a1>65\%$.

4. The touch display panel of claim 3, wherein the slits further comprises:
a second group of slits extending along a fourth direction, wherein the fourth direction crosses the first direction, the second direction and the third direction.

5. The touch display panel of claim 1, wherein each of the sub-pixel units of the array substrate comprises:
a plurality of reflective pieces disposed on the substrate and separated with each other, wherein each of the reflective pieces corresponds to the first region, the second region and the third region of each of the color resists one by one.

6. The touch display panel of claim 5, wherein the reflective pieces include metal.

7. The touch display panel of claim 5, wherein each of the sub-pixel units further comprises:
a plurality of pixel memory circuits electrically connected to the reflective pieces, wherein the reflective pieces comprise a first reflective piece, a second reflective piece and a third reflective piece, the first reflective piece, the second reflective piece and the third reflective piece correspond to the first region, the second region and the third region of each of the color resists, respectively, the pixel memory circuits comprise a first circuit electrically connected to one of the first reflective piece, the second reflective piece and the third reflective piece and not electrically connected to another one thereof.

8. The touch display panel of claim 7, wherein the first circuit is electrically connected to the first reflective piece, and the first circuit is not electrically connected to the second reflective piece and the third reflective piece.

9. The touch display panel of claim 7, wherein the first circuit is electrically connected to the second reflective piece, and the first circuit is not electrically connected to the first reflective piece and the third reflective piece.

10. The touch display panel of claim 7, wherein the first circuit is electrically connected to the third reflective piece, and the first circuit is not electrically connected to the first reflective piece and the second reflective piece.

11. The touch display panel of claim 1, wherein each of the color resists completely overlap each of the plurality of slits of the particular one of the sub-pixel unit, and each of the plurality of slits extend from the second region to either the first region or the third region.

* * * * *